324-77
12/2/86 XR 4,626,102 SR

United States Patent [19]
Storck et al.
[11] Patent Number: 4,626,102
[45] Date of Patent: Dec. 2, 1986

[54] BRAGG CELL SPECTRAL ANALYZER WITH A PRISM EXPANSION SYSTEM

[75] Inventors: Eckhard Storck; Ulrich Wolff, both of Munich, Fed. Rep. of Germany

[73] Assignee: Siemens Aktiengesellschaft, Berlin and Munich, Fed. Rep. of Germany

[21] Appl. No.: 698,847

[22] Filed: Feb. 6, 1985

[30] Foreign Application Priority Data

Feb. 10, 1984 [DE] Fed. Rep. of Germany ....... 3404822

[51] Int. Cl.[4] ........................ G01J 3/06; G01R 21/17; G02F 1/33

[52] U.S. Cl. .................................... 356/328; 250/216; 324/77 K; 350/358

[58] Field of Search ........................ 356/300, 328, 334; 250/578, 216; 350/358; 324/77 K

[56] References Cited

PUBLICATIONS

Hecht, "Spectrum Analysis Using Acousto-Optic Devices", *Optical Engineering,* vol. 16, No. 5, Sep./Oct. 1977, pp. 461–466.

P. Jacquinot et al, "Apodisation", *Progress in Optics III,* E. Wolf, Editor, North Holland Publishing Co., Amsterdam, 1964, pp. 49–58.

J. Ost et al, "Techniques for Generation and Adjustment of Reference and Reconstructing Waves in Precision Holography", *Optics Technology,* Nov. 1969, pp. 251-254.

*Primary Examiner*—Vincent P. McGraw
*Attorney, Agent, or Firm*—Hill, Van Santen, Steadman & Simpson

[57] ABSTRACT

A Bragg cell spectral analyzer with a prism expansion system for a laser beam, which has a Gaussian cross-sectional distribution of light intensity, is generally superimposed with stray light, and is conducted along a path through the system to a Bragg cell characterized by an aperture diaphragm being positioned in the path before the prism expansion system with the diameter of the aperture being selected to be larger than the half-width value of the Gaussian cross-sectional distribution. The prism expansion system only expands the laser beam to such a degree that the half-width value of the Gaussian cross-sectional distribution is smaller than the diameter of an aperture of the Bragg cell. As a result thereof, the diffraction side lobes of the spectrum can be reduced by apodization relative to the principal maximum of the spectrum and stray light contained in the laser beam can be blanked out.

9 Claims, 2 Drawing Figures

Laser
1 11 6 i 21 d 61 $I_0$ 60 2 22 23 62 3 p' $I_0'$ 31 $I=I_0' \cdot 3 \cdot 10^{-4}$ 4 5

Laser
1
11
6
$I_0$
60
i
d
21
61
22
2
23
$p'$
$I_0'$
62
31
$I = I_0' \cdot 3 \cdot 10^{-4}$
3
4
5

23
233
234
3

BRAGG CELL SPECTRAL ANALYZER WITH A PRISM EXPANSION SYSTEM

BACKGROUND OF THE INVENTION

The present invention is directed to a Bragg cell spectral analyzer with a prism expansion system for the expansion of a laser beam being conducted to the Bragg cell. The laser beam emerges from an opening, which has a diameter lying in the order of magnitude of a millimeter, as a parallel bundle of light which has a Gaussian cross-sectional distribution of the light intensity and the beam is supplied in this form to the expansion system. Stray light may be superimposed on the emerging parallel bundle of light.

An analyzer of a type having a prism expansion system is disclosed in *Optical Engineering,* Vol. 16, No. 5, Sept./Oct. 1977, pp. 461–466. In the disclosed analyzer, the laser beam is so greatly expanded by the expansion system that the half-width value of the Gaussian cross-section distribution of the intensity, which is assumed as ideal, is of approximately the same size as the aperture of the Bragg cell. The frequency resolution of the Bragg cell is fully utilized by means of the specific Gaussian apodization. However, on the other hand, a spectrum still has relatively high diffraction fringes where side lobes will occur. The relationship of the height or intensity of these diffraction side lobes relative to the height or intensity of the principal maximum of the spectrum defines the dynamic range of the analyzer. With the diffraction side lobes being lower in comparison to the principal maximum, the dynamic range is all the greater.

SUMMARY OF THE INVENTION

Given a Bragg cell spectral analyzer of the above-mentioned type, the object of the present invention is to disclose how a higher dynamic, particularly a dynamic of more than 30 dB, can be achieved and at the same time provide a stable structure for the analyzer.

This object is achieved by an improvement in a Bragg cell spectral analyzer comprising an expansion system for the expansion of a laser beam conducted to the Bragg cell having an aperture, said laser beam emerging from an opening, which has a diameter lying in the order of magnitude of a millimeter, as a parallel bundle of light having a Gaussian cross-section distribution of the light intensity and being supplied in this form to an expansion system and wherein strong light is superimposed on the emerging parallel beams of light. The improvements are that the expansion system is a prism expansion system and includes an aperture diaphragm being disposed in the path of the laser beam in front of the prism expansion system, said aperture diaphragm being disposed a distance from the opening from which the laser beam emerges on the order of magnitude of a meter and has an aperture with a diameter on the order of magnitude of a millimeter which is greater than the half-width value of a Gaussian cross-sectional distribution and cuts off the Gaussian cross-sectional distribution at the edges, and the prism expansion system expanding the diffraction-limited laser beam which emerges from the aperture diaphragm with the Gaussian cross-sectional distribution cut off at its edges to such a degree into an expanded laser beam having a prescribable intensity value I of the expanded, cut-off Gaussian cross-sectional distribution at the edges of the aperture of the Bragg cell beam lower than half of the maximum intensity value at the center of the cross-sectional distribution of the expanded laser beam which will prevail at the edges of the aperture of the Bragg cell.

The following perceptions have led to this solution. An apodization of the diffraction side lobes can be simply achieved in that the laser beam is not as greatly expanded, for example, in that the half-width value remains small in comparison to the aperture of the Bragg cell. The intensity at the edges of the Bragg cell aperture is then considerably lower and as a result thereof the diffraction at the edges is decisively reduced. How low the intensity at the edges of the cell aperture must be so that the level of the diffraction side lobes in the spectrum remain below a prescribed level, for example, below 50 dB and how large the width of the principal maximum then is in comparison to the theoretical option can be derived in a known manner as set forth in a paper by P. Jaquinot and B. Roizen-Dossier, "Apodization", *Progress in Optics III,* E. Wolf, Editor, North Holland Publishing Co., Amsterdam, 1964, p. 55. For example, for a 50 dB, i.e., for a dynamic range of 50 dB, the amplitude of the Gaussian distribution must be cut off at a value exp $(-4)$ and, accordingly, the intensity will be cut off at a value exp $(-8)=3\times10^{-4}$.

In a real case, the Gaussian cross-section distribution of the intensity of the laser beam is superimposed by scattered light. This scattered light has a disrupting effect for the apodization and must therefore be eliminated or moderated.

Accordingly, the practical object given apodization for achieving a higher dynamic range, particularly the 50 dB dynamic range, lies in the elimination of the scattered light or, respectively, noise without the Gaussian cross-sectional distribution being thereby destroyed, for example, due to diffraction.

Two optical systems are standard for the elimination of the scattered light: (a) microscope objective with a mode diaphragm and (b) a monomode optical fiber.

Given a system utilizing a microscope objective with a mode diaphragm, the laser beam is focused by the microscope objective and the mode diaphragm having an extremely small aperture dimension, for example, in the range of 10 $\mu$m, is disposed in the focus of the lens so that the diaphragm only transmits the basic mode of the laser beam and the scattered light is focused laterally next to the aperture of the diaphragm and is blocked. What is decisive and critical is the exact matching of the microscope objective and the mode diaphragm to the existing laser beam diameter. When the mode diaphragm is too large, then too much scattered light is transmitted and when it is too small, then the Gaussian cross-sectional distribution of the intensity of the laser beam is destroyed by diffraction. This system can only be realized with select, high-quality microscope objectives and with a high adjustment outlay in the fabrication and setting of the mode diaphragm. In addition, a high quality collimator lens, which is carefully selected, is also required for producing a focused laser beam stripped of the scattered light and having the desired Gaussian cross-sectional distribution from the divergent ray bundle emerging from the mode diaphragm.

In comparison to the above-mentioned system, the second system comprising the monomode fiber is somewhat less involved and sensitive to adjustment. Given this system, the laser light is focused into the monomode optical fiber in whose core only the Gaussian component is conducted whereas the scattered light exits into the sheath and is finally eliminated by means of a sheath-mode stripper. The light emerging from the other end of the monomode fiber is emerging as a pure Gaussian mode and is collimated by means of a high-quality lens as in the first-mentioned system which utilized the mode diaphragm.

Both systems involve the practical job in apodization and also represent the required expansion system for the laser beam. However, they are obviously little suited for a stable structure of a Bragg cell spectral analyzer. A prism expansion system has proven particularly suitable for the expansion of the laser beam for the reasons of stability for a stable structure particularly a compact structure of such an analyzer. Given such a system, however, the laser light cannot be stripped of scattered light, i.e., it admits of no increase in the dynamics of the analyzer from the very outset, particularly no increase of the dynamics to 50 dB range.

The present invention has disclosed a way for how the practical job in the apodization can be resolved even given a prism expansion system that is beneficial with respect to stability. For example, how a Gaussian cross-sectional distribution of the intensity of the laser light, that is largely stripped of disturbing light, can be achieved. This is achieved by means of the aperture diaphragm which is disposed in the path of the laser beam before it reaches the prism expansion system and at a distance in front of the opening from which the laser beam emerges on the order of magnitude of a meter. The aperture of the diaphragm also has a diameter on the order of magnitude of a millimeter which is greater than the half-width value of the Gaussian cross-sectional distribution.

The inventive solution also generally encompasses a novel expansion system which resolves the practical task of the Gaussian apodization. The diameter of the aperture of the diaphragm is larger than the half-width value of the Gaussian cross-sectional distribution of the intensity of the laser beam, for example, n times larger than the diameter of the aperture of a mode diaphragm and substantially less precision is required for the manufacture thereof than in the case of the mode diaphragm. The diameter of the aperture or opening of the aperture diaphragm lies in a millimeter range.

An advantageous development of the inventive analyzer occurs when the intensity value I of the expanded, cut-off Gaussian cross-sectional distribution of the expanded laser beam at the edges of the aperture of the Bragg cell is about equal to $3\times10^{-4}$ of the maximum intensity value $I'_0$ in the center of the cross-section distribution of the expanded laser beam. Given this development, the intensity value at the edge of the opening of the aperture diaphragm corresponds to the intensity value at the edge of the aperture of the Bragg cell. Given a preferred embodiment of the analyzer of the invention, the aperture diaphragm is disposed in the laser beam directly in front of the prism expansion system. Thus, the diameter of the aperture diaphragm is selected so that it will be expanded by the prism expansion system to the diameter of the aperture of the Bragg cell.

It is particularly advantageous that given an analyzer of the invention, particularly one wherein the cut-off Gaussian cross-sectional distribution at the edges of the aperture of the Bragg cell is about equal to $3\times10^{-4}$ of the maximum intensity at the center of the cross-sectional distribution, a dynamic range of 50 dB can be achieved when the expanded laser beam emerging from the prism expansion is conducted to the Bragg cell by a focusing objective for the illumination of the aperture of the Bragg cell and this focusing objective focuses the laser beam such that the focus in the form of focal lines lie outside of the Bragg cell. Thus, the diameter of the aperture diaphragm is selected such that the intensity of the laser beam at the edge of the Bragg cell aperture amounts to exactly to $3\times10^{-4}$ of the intensity value of the beam center.

The lower dynamic limit of the Bragg cell, which is given by the signal power NEP equivalent to the stray light, can be reduced when the analyzer of the invention is designed either with a focusing of the light leaving the expanding system or without the light being focused. Such a combination of illumination with the inventive prism expansion system with the aperture diaphragm enables a particularly simple, stable and compact format of the analyzer.

DESCRIPTION OF THE PREFERRED EMBODIMENTS

Figure 1:
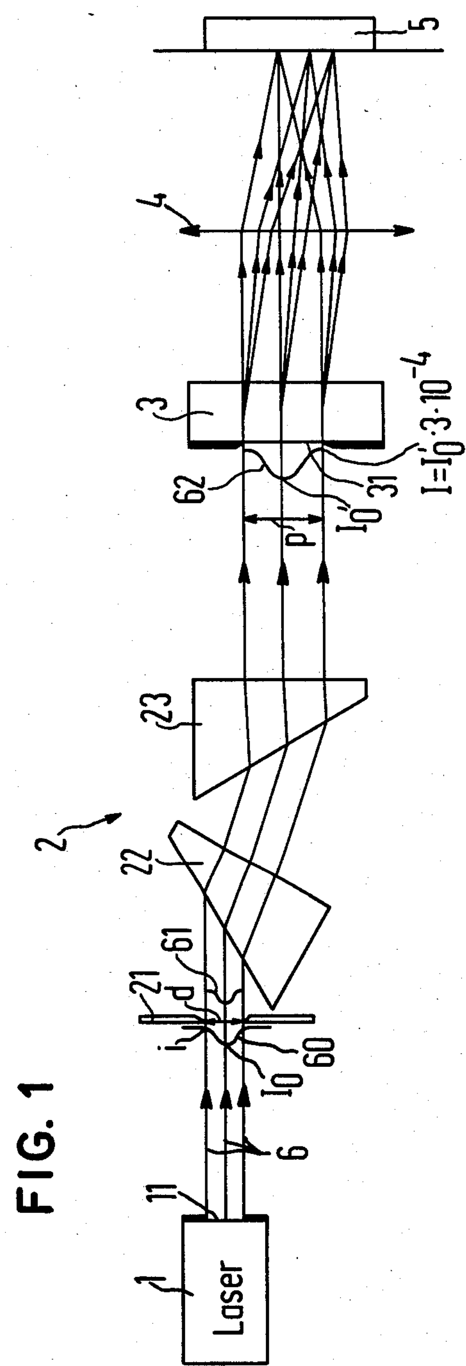
FIG. 1 is a schematic illustration of an exemplary structure of a Bragg cell analyzer in accordance with the invention with the beam diameters being greatly exaggerated for purposes of illustration.

The principles of the present invention are particularly useful when incorporated in a Bragg cell analyzer as illustrated in FIG. 1. The Bragg cell analyzer includes a laser 1, a prism expansion system 2 with an apodization diaphragm, a Bragg cell 3, a transformation lens 4 to create a Fourier transformation and a detector arrangement 5.

The laser 1 emits a laser beam 6, which emerges from the laser 1 through an opening 11 having a diameter in the millimeter range, for example, 2 millimeters. The beam 6, which is composed of a bundle of parallelly extending light rays, has a Gaussian cross-sectional distribution 60 for the intensity, and this beam is superimposed with stray light. The maximum of the intensity is in the center of the beam and is referenced $I_0$.

The prism expansion system 2 is composed of an aperture diaphragm 21, which is positioned in the path of the laser beam 6 and forms the apodization diaphragm. In addition, the system 2 includes the two expansion prisms 22 and 23, which are following the diaphragm 21 in the direction of the beam path.

The aperture diaphragm 21 has an aperture diameter d which is selected to be larger than the half-width value of the Gaussian cross-sectional distribution of the laser beam 6 and is dimensioned so that the curve 60 of the Gaussian cross-sectional distribution at the edge is cut off at a specific, extremely low intensity value i in comparison to the intensity value $I_0$ in the center of the beam 6.

It is important that the diameter of the opening 11 of the laser through which the laser beam emerges from the laser lies in the order of magnitude of 1 millimeter and that the laser beam 6 emerging from this opening transverses a path on the order of magnitude of one meter with a constant cross-section up to the aperture diaphragm 21. For only then do the opening 11 at the laser 1 and the aperture or opening of diaphragm 21 form a system which, for example, has diaphragms having a size of 2 millimeters at a distance in the range of 1 meter and which system only transmits the basic mode of the laser beam diffraction limited and blocks the stray light of the laser beam. The theoretical bases for doing this are known to a person of ordinary skill in the art and examples of what is known is disclosed in an article by J. Ost and E. Storck, "Techniques for Generation and Adjustment of Reference and Reconstructing Waves in Precision Holography", *Optics Technology*, Nov. 1969, pp. 251–254. In particular, the comments under the headings "General Remarks" and "Diaphragm Method" are examples of what is known.

Fundamentally, the diameter of the opening 11 of the laser 1 and the diameter d of the aperture of the aperture diaphragm 21 could also be in the order of magnitude of a centimeter. However, the spacing required for blanking out the stray light would then be in the order of magnitude of 10 m or even 100 m which does not come into practical consideration for laboratory purposes and for a compact structure of the Bragg cell spectral analyzer.

The diffraction-limited laser beam emerging from the aperture diaphragm 21 has the cut-off Gaussian cross-sectional distribution 61. This diffraction limited laser beam is then expanded by the two prisms 22 and 23 into an expanded laser beam which illuminates an aperture 31 of the Bragg cell 3.

The diameter p of the expanded laser beam corresponds to the diameter of the aperture 31 of the Bragg cell 3. The expanded laser beam has a Gaussian cross-sectional distribution 62 for the light intensity. For example, the curve 62 corresponds to the curve 61 except for its elongation to a diameter p. The aperture diameter d of the aperture diaphragm 21 and/or the expansion of the laser beam are dimensioned so that the intensity I of the expanded laser beam at the edges of the aperture of the Bragg cell amount to $3\times10^{-4}\times I'_0$, wherein $I'_0$ is the intensity value at the center of the beam. In the present case, the intensity value I at the edge of the aperture corresponds to the intensity value i at the edge of the aperture of the diaphragm 21.

The light emerging from the Bragg cell 3 is then focused through the transformation lens 4 onto the detector array of the detector 5 for interpretation.

The intensity value at the edge of the aperture 31 of the Bragg cell 3 and thus the cut-off Gaussian cross-sectional distribution 62 is selected so that the diffraction side lobes are depressed by means of the Gaussian apodization and stripping of the laser beam of stray light. Thus, the diffraction side lobes are depressed below a level which allows an ambient dynamic range of the Bragg cell spectral analyzer of 50 dB.

Figure 2:
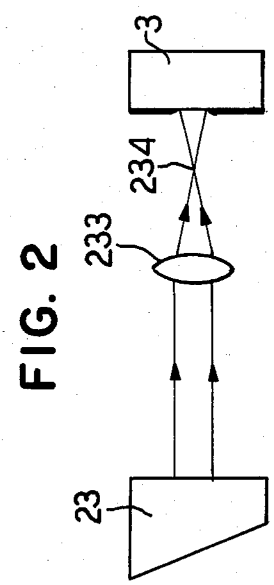
FIG. 2 is a schematic illustration of a lens being placed in the path of the expanded laser beam in FIG. 1 and focussing this beam so that the focus lies outside of the Bragg cell.

The expanded laser beam, which has a diameter p when it emerges from the prism 23 and is conducted to the Bragg cell 3, may be focused in a traditional way by a lens 233 shown in FIG. 2 and being placed in the path of the expanded laser beam so that the focus lies in the center of the Bragg cell 3. As already mentioned, it is advantageous to place the focus 234 not in the center of the Bragg cell but outside of it, for example, at a position between the prism 23 and the Bragg cell 3, as shown in FIG. 2. It is particularly advantageous, however, to forego a focusing altogether and to directly illuminate the Bragg cell with the expanded laser beam which emerges from the prism 23. Thus, the path between the prism 23 and Bragg cell 3 is free of focusing optics or lenses.

Although various minor modifications may be suggested by those versed in the art, it should be understood that we wish to embody within the scope of the patent granted hereon, all such modifications as reasonably and properly come within the scope of our contribution to the art.

We claim:

1. In a Bragg cell spectral analyzer having a Bragg cell with an expansion system for the expansion of a laser beam conducted to the Bragg cell having an aperture, said laser beam emerging from an opening, which has a diameter lying in the order of magnitude of a millimeter, as a parallel bundle of light having a Gaussian cross-sectional distribution of the light intensity and passing through the expansion system in this form with superimposed stray light, the improvements comprising said expansion system being a prism expansion system and including an aperture diaphragm being disposed in the path of the laser beam in front of the prism expansion system, said aperture diaphragm being disposed a distance in front of the opening from which the laser beam emerges on the order of magnitude of a meter and having an aperture with a diameter of an order of magnitude of a millimeter which is greater than the half-width value of the Gaussian cross-sectional distribution and cuts off the Gaussian cross-sectional distribution at the edges, and said prism expansion system expanding the diffraction-limited laser beam emerging from the aperture diaphragm with a Gaussian cross-sectional distribution cut-off at its edges to such a degree into an expanded laser beam having a prescribable intensity value I of the expanded, cut-off Gaussian cross-sectional distribution at the edges of the aperture of the Bragg cell being lower than half of the maximum intensity value at the center of the cross-section distribution of the expanded laser beam.

2. In a Bragg cell spectral analyzer according to claim 1, wherein the intensity value I of the expanded, cut-off Gaussian cross-sectional distribution of the expanded laser beam at the edge of the aperture of the Bragg cell is about equal to $3\times10^{-4}\times I'_0$, wherein $I'_0$ is the maximum intensity value in the center of the expanded laser beam.

3. In a Bragg cell spectral analyzer according to claim 2, wherein the diameter of the aperture of the aperture diaphragm is selected so that it is expanded by the prism expansion system to the diameter of the aperture of the Bragg cell.

4. In a Bragg cell spectral analyzer according to claim 3, wherein the expanded laser beam emerging from the prism expansion system is conducted to the Bragg cell via a focusing optic for the illumination of the aperture of the Bragg cell, said focusing optic focusing the expanded laser beam so that the focus in the form of a focal line lies outside of the Bragg cell.

5. In a Bragg cell spectral analyzer according to claim 3, wherein the path of the expanded laser beam emerging from the prism expansion system and extending to the Bragg cell is free of focusing optics so that the expanded laser beam is conducted directly to the Bragg cell to illuminate the aperture without being focused thereon.

6. In a Bragg cell spectral analyzer according to claim 2, wherein the expanded laser beam emerging from the prism expansion system is conducted directly to the Bragg cell focus for illumination of the aperture of the Bragg cell along a path free of any focusing optic.

7. In a Bragg cell spectral analyzer according to claim 2, wherein the expanded laser beam emerging from the prism expansion system is conducted along a path to the Bragg cell, said path having focusing optics for focusing the laser beam so that the focus is in the form of a focal line positioned outside of the Bragg cell.

8. In a Bragg cell spectral analyzer according to claim 1, wherein the diameter of the aperture of the aperture diaphragm is selected so that it is expanded by the prism expansion system to the diameter of the aperture of the Bragg cell.

9. In a Bragg cell spectral analyzer according to claim 1, wherein the expanded laser beam emerging from the prism expansion system is conducted to the Bragg cell along a path containing focusing optics, said focusing optics focusing the laser beam so that the focus is in the form of a focal line lying outside of the Bragg cell.

* * * * *